(12) United States Patent
James et al.

(10) Patent No.: US 9,104,007 B2
(45) Date of Patent: Aug. 11, 2015

(54) STORAGE ASSEMBLY FOR FIBRE-OPTIC CABLES

(71) Applicant: HellermannTyton Data Limited, Northampton (GB)

(72) Inventors: Jason James, Northampton (GB); Matt Badman, Northampton (GB)

(73) Assignee: HELLERMANN TYTON DATA LIMITED (GB)

(*) Notice: Subject to any disclaimer, the term of this patent is extended or adjusted under 35 U.S.C. 154(b) by 0 days.

(21) Appl. No.: 13/956,486

(22) Filed: Aug. 1, 2013

(65) Prior Publication Data

US 2013/0315550 A1  Nov. 28, 2013

Related U.S. Application Data

(63) Continuation of application No. PCT/GB2012/050188, filed on Jan. 30, 2012.

(30) Foreign Application Priority Data

Feb. 1, 2011  (GB) .................................. 1101749.8

(51) Int. Cl.
*G02B 6/00* (2006.01)
*G02B 6/44* (2006.01)

(52) U.S. Cl.
CPC ............ *G02B 6/4452* (2013.01); *G02B 6/4442* (2013.01); *G02B 6/4453* (2013.01); *G02B 6/4471* (2013.01)

(58) Field of Classification Search
USPC ........................................................ 385/135
See application file for complete search history.

(56) References Cited

U.S. PATENT DOCUMENTS

| | | | |
|---|---|---|---|
| 5,751,882 A | 5/1998 | Daems et al. | |
| 7,418,186 B1 | 8/2008 | Grubish et al. | |
| 2002/0003940 A1 | 1/2002 | Araki et al. | |
| 2009/0238531 A1* | 9/2009 | Holmberg et al. | 385/135 |

FOREIGN PATENT DOCUMENTS

| | | |
|---|---|---|
| DE | 10314262 A1 | 6/2004 |
| WO | 9732231 | 9/1997 |

OTHER PUBLICATIONS

PCT/GB2012/050188 International Search Report and Written Opinion.

* cited by examiner

*Primary Examiner* — Eric Wong
(74) *Attorney, Agent, or Firm* — Brinks Gilson & Lione

(57) ABSTRACT

A channelling assembly for guiding cable on a cable management tray is formed by a ducted member having an inlet end and an outlet end so as to form open channels into which cable can be laid through the open top of each channel. A retaining member is associated with each channel. Each retaining member is engaged with the tops of a neighboring pair of partitions so as to close the top of the channel formed between the partitions. A resiliently deformable region is formed on each retaining member, which extends down into the channel upon engaging the retraining member with the partitions so as to compress cables located in the channel between the resiliently deformable member and the bottom of the channel, and thus securely retain the cables in place.

5 Claims, 7 Drawing Sheets

STORAGE ASSEMBLY FOR FIBRE-OPTIC CABLES

CROSS-REFERENCE TO RELATED APPLICATIONS

This application is a continuation of International Application No. PCT/GB2012/050188, filed on Jan. 30, 2012, which claims the benefit of GB 1101749.8, filed on Feb. 1, 2011. The disclosures of the above applications are incorporated herein by reference.

FIELD

The present disclosure relates to improvement in relation to apparatus for storing and managing fibre-optic cables.

BACKGROUND

The statements in this section merely provide background information related to the present disclosure and may not constitute prior art.

Fibre optical cables are increasingly replacing copper based cables for use in transmitting data and voice services, such as internet access, telephone services and the like. In order to obtain best efficiency in changeover of such services to be fibre-optic based, the required cable infrastructure is normally installed on a large scale—cabling being installed, at least at street level, for whole streets at a time. This reduces the need for digging up roads etc a number of times as once the core cabling is present, in order to connect a new user, it is simply necessary to run a link from the main cable to the particular location to which the service is to be delivered. This may be done using conventional cable pulling techniques or other established means such as blowing under air pressure specially adapted cables through pre-installed ducts.

In order to facilitate the connection operations, the core cabling is typically routed between cable management enclosures located at regular intervals or as necessary along the cable run. These are weatherproof/watertight enclosures, typically located in manholes, access pits, slot boxes, sewerage systems or at the top of telegraph poles, in which the core cable may typically be diverted/spurred, looped, and then tracked back in its path along the street. The loop of the cable which is contained within the enclosure is protected from the environment and the protective outer sleeving can be removed, exposing the cable bundles located therein. These individual cable bundles and individual fibres thereof can then be managed for simple storage, splicing, splitting and the like, as required in order to meet customer requirements. For example, to provide fibre based services to a new location, an engineer will simply remove the cover to access the interior of the enclosure and then carry out the necessary operations on the fibres exposed therein (splicing, splitting) etc to connect the fibre based infrastructure to the required location.

As illustrated in prior art document WO97/32231, it is known in the art to manage the fibre bundles and fibres within the enclosure by use of splice cassettes hinged on a back plate which in turn are mounted on a support frame so as to be slidable thereon. A number of different splice cassettes are available for performing different operations (single element splicing, single circuit splicing, storage, splitting, etc). The assembly is modular, so that the engineer can select the back plate and cassette combinations required to suit the technical requirements of any particular enclosure.

Once the main outer protective sleeving is removed from a cable, the cable will usually be separated into smaller bundles, each separate sub-bundle being surrounded by its own protective sleeve. If there is no immediate requirement for the individual fibres of any of the bundles or some are being left unbroken in a looped installation for the fibres to be spliced and distributed elsewhere, these bundles will usually simply be coiled up to minimise the space they take up within the enclosure and stored in a dedicated storage area, typically (but not exclusively) on the rear of the tray support frame. Others of the bundles will be separated into their individual fibres by removing the protective sheathing to expose the fibres. In order to protect the exposed fibres, longitudinally extending cable passageways are provided on each side of each fibre management back plate, the exposed fibres being routed into the passageways for directing them along the back plate(s). Each back plate is furthermore provided with guide tracks, formed by spaces between guide projections formed on the back plates, which extend across each back plate between the passageways located on either side. These tracks are used to guide the individual fibres as they are tracked out of the passageways and across the back plate to a cassette mounted thereon for management and splicing purposes. The tracks operate to protect the individual fibres from damage as they extend across the back plate, ensuring that their minimum bend radius is not exceeded as they transition from the passageway to the track, and also helps to keep them tidy.

In the prior art, the guide tracks are configured to provide a curved entry path extending from the tunnel so as to control the minimum bend radius of the fibres. As shown in FIG. 2b of WO97/32231, this is achieved by configuration of the guide projections so that each track extends along a curved path, curving upwards towards the top of the back plate. This arrangement works fine for routing fibres out of or into a passageway coming from or directed towards the top of the back plate. However, it prevents a fibre being routed from a cassette at the bottom of the back plate to a cassette mounted higher up—the asymmetrical curving of the track would mean that a fibre would have to be bend through a very sharp angle in order to track from the bottom of the back plate into one of the back plate passageways.

SUMMARY

The present disclosure provides a fibre management back plate for use in a fibre management system, the back plate comprising: means extending longitudinally along at least one side of the back plate for channelling fibre cabling along the back plate in a protected manner, fastening means spaced apart from said channelling means for mounting at least one fibre management cassette to the back plate, and guide means formed on the back plate between the at least one channelling means and the fastening means for guiding fibres from said channelling means towards the fastening means in a protected manner, wherein said guide means comprises at least one row of guide posts upstanding from the surface of the back plate and extending longitudinally along the back plate parallel and proximate to the at least one channelling means, each post being at least one row spaced from its neighbours so as to form a fibre routing channel there between, the end of each post proximate to the at least one channelling means narrowing so that the mouth of each routing channel funnels substantially symmetrically inwards in a direction away from the at least one channelling means towards the fastening means.

A back plate in accordance with the present disclosure has the advantage that the symmetrical funneling into each fibre channel enables fibres to be routed into and out of the channelling means in either direction, thereby increasing the flexibility of the fibre management and fibre routing on the back plate.

In one form, channelling means is provided along either longitudinal side of the back plate, at least one row of guide posts being associated with each channelling means. This enables routing of fibres in either direction along either side of the back plate.

The channelling means is advantageously formed by longitudinally extending passageways which are open towards the neighbouring longitudinally extending row of guide posts so as to enable easy directing of fibres out of the tunnels between said posts.

In another form, the narrowing of the neighbouring ends of the posts may be achieved by said ends being curved, in particular being hemispherically shaped, the curvature being greater than the minimum bend radius of the fibres. Alternatively, said ends may taper symmetrically inwards to a point.

In prior art systems, such as illustrated in FIG. 2b of WO97/32231, the fibres are typically routed across the centre of the back plate in a laterally extending groove which extends underneath the management cassette. Each end of the groove is ramped upwards so as to direct the fibres upwards towards the cassette at the end of the groove. Due to the fact that these systems utilise ramped ends of the grooves to direct the fibres off of the back plate, the fibre from one side of the back plate must be routed along the whole length of the groove. As a result, the fibres routed to and from any particular cassette will cross over on the back plate, risking entanglement when fibres are moved or cassettes are pivoted about their respective hinges. Also, the space which must exist between the bottom of the back plate and the ends of the grooves means that the fibres will be exposed as they transition from the back plate to the cassette, increasing the risk of damage.

According to another aspect of the present disclosure there is provided a fibre management cassette for pivotal attachment to a fibre management back plate, the cassette having a ramped entry guide formed on the bottom thereof extending downwards from the bottom of the guide towards either side of the cassette such that fibres may be guided onto the cassette from either side along said ramped entry guide.

A fibre management cassette in accordance with the present disclosure has the advantage that the fibres are better protected as they transition from the back plate onto the cassette. Furthermore, fibres from each side are guided onto the cassette by the ramp surface facing that side, which can be configured to pick up the fibre before the centre line of the back plate, thereby preventing fibres crossing over on the back plate.

In one form, the ramped entry guide is a unitary surface which is centrally located on the cassette and extends from a central hump downwards towards either side of the cassette. Alternatively, however, two separate entry guides may be formed, one proximate each side of the cassette and directed towards its proximate side.

The entry guide may be sized to as, in use, to extend into proximate to the top surface of the back plate, thereby minimising the exposure of the fibres as they transition from the back plate to the cassette.

The problems of fibre damage are also increased with the prior art system by the use of multiple spaced apart attachment points for fastening the cassette to the back plate. As can be seen in FIG. 2b of WO97/32231, the groove along which the fibres are directed goes underneath the fastening points, and this can result in fibres within the groove being damaged as a cassette is attached to or removed from the back plate.

According to a further aspect of the present disclosure, there is provided a fibre management back plate having a plurality of anchoring means formed in a longitudinally extending row thereon, each anchoring means providing an attachment for a single management cassette and comprising a single anchoring point of said cassette.

A fibre management back plate in accordance with the present disclosure has the advantage that attachment and removal of a cassette from the back plate is simplified and less likely to result in damage to fibres.

In one form, each anchoring point comprises a laterally extending tubular opening into which a complementary peg formed on the bottom of the cassette engages to pivotally mount the cassette onto the back plate.

In another form, the back plate further provides guide means for guiding fibres from each side of the back plate towards a cassette mounted thereon, a first transition area for transitioning, in use, fibres from one side of the back plate onto a cassette, said first transition area being located between said one side and the centre of the back plate, a second transition area for transitioning, in use, fibres from the other side of the back plate onto the cassette, said second transition area being located between said other side and the centre of the back plate, and said anchoring point being located between said first and second transition areas. This has the advantage that the fibres are separated from the anchoring point, thereby reducing the possibility of fibres being damage by the anchoring means as a cassette is attached to or removed from the back plate.

Conventionally, fibre management systems have used cassettes of uniform thickness so that a cassette can be attached to each fastening point on a back plate. This has the drawback that it limits flexibility as far as management operations on the cassettes are concerned, as the thickness of the cassette will limit the maximum number and type of fibres or PON devices such as optical splitters that can be managed thereon.

According to the present disclosure there is provided a fibre management system comprising a plurality of fibre management back plates, each back plate having a plurality of identical fastening means formed thereon for releasably fastening a management cassette thereto, and a plurality of management cassettes, each cassette having a complementary fastening means formed thereon for releasably engaging with the fastening means provided on the back plate, wherein said plurality of cassettes include at least one cassette of a first thickness substantially equal to the centre distance between neighbouring fastening means of the back plate, and at least one cassette of a second thickness which is greater than said first thickness, every fastening means of each said back plate may be occupied by said cassettes of said first thickness, whereas a cassette of said second thickness obstructs at least one fastening means of said back plate adjacent said fastening means to which said back plate is attached, thereby permitting attached of said cassettes of said second thickness only to at least every other fastening means of said back plate.

A fibre management system according to the present disclosure has the advantage that it provides increased flexibility, allowing an engineer to use a cassette of an appropriate size for the particular task without otherwise inhibiting the operation of the management system.

According to one aspect of the present disclosure, the second thickness is double said first thickness, the fastening means of said cassette of said second thickness being located proximate one face thereof (either the front or rear face) so that, when mounted on the back plate, only the neighbouring fastening means of the back plate on one side is obstructed.

Cassettes of multiple additional thicknesses may also be provided, although each thickness may be an integer multiple of said first thickness. In the case of an odd integer multiple thickness, the fastening means may then be located centrally of the thickness of the cassette so that an equal number of fastening means in front and behind the utilized fastening means of the back plate are obscured.

It is conventional in the art to utilize a securing strap over the management cassettes to ensure against pivotal movement relative to the back plates when not being managed. In particular, a strap is known to be provided which is secured to one end of the management assembly and releasably fastened to the other end with the strap extending across the top and front edges of the cassettes. When tightened down over the cassettes, the cassettes are then prevented from moving upwards relative to the back plates, and hence pivotal movement is prevented.

According to the present disclosure, there is provided a fibre management cassette having attachment means formed thereon by means of which a strap is attachable to said cassette.

The present disclosure further provides a fibre management system comprising a plurality of fibre management cassettes according to the present disclosure pivotally mounted on at least one management back plate, and a retaining strap having a first end secured relative to said at least one management back plate and a second end releasably attachable to the attachment means of any one of said fibre management cassettes, whereby said strap is engaged with any particular cassette in order to hold said particular cassette, and every other cassette between said particular cassette and said first end of the strap, in a position in which a cassette neighbouring said particular cassette is exposed.

This aspect of the present disclosure has the advantage that the strap may be used to hold a selected block of management cassettes in a forward position so as to expose the fibre management side of a particular cassette whilst leaving both hands of the operator free.

The fastening means may take the form of at least one hole, hoop or buckle formed on the back of each cassette, through which the strap, or a separate device mounted on the strap, maybe looped or clipped and then fastened, for example, back on itself using hook and loop material. Alternatively, the fastening means may be formed on the top end of each cassette so that the fastening means of the cassettes do not interfere with each other when the cassettes are stacked together on a management back plate.

Typically fibre storage trays will store a variable number of fibres depending on the level of usage in the particular raceway—if a large number of connections are active, a large number of fibres will be in use and hence a smaller number will be held on the storage tray. Conversely, when there is low usage such as upon first installation, a large number of fibres will be held the storage tray.

A typical storage tray has channels open to the top of the tray into which the fibres are laid for feeding onto the storage trays. When fibres are laid in the channel, they are oriented to ensure that they are routed on the tray in the correct manner without excessive bending or the like which could cause damage to the fibre. It is therefore important that the fibres are retained securely within the channels in the desired orientation whilst at the same time are not crushed which could cause damage to them. This can be difficult due to the fact that the number of fibres passing through each channel will vary during use and hence the size of each channel has to be adjustable to maintain suitable engagement with the fibres as the usage varies.

One solution to the problem known in the prior art is to form each channel with a series of longitudinally extending ribs on each side thereof. Dividers are then engageable in the channels supported in position by the ribs so as to sub-divide each channel into a series of conduits that are separated from each other. In this way, fibres can be kept apart within the same channel and firmly retained together in the sub-bundles between the dividers. The problem with this approach is that each channel can only be divided into sub-passages of a set size which may not enable fibre bundles of all sizes to be properly held.

According to the present disclosure, there is provided a channelling assembly for guiding cable on a cable management tray, the assembly comprising a ducting member having an inlet end, and outlet end and partitions extending between the inlet end and the outlet end so as to form open top channels therebetween into which cable can be laid through the open top of each channel, and a retaining member associated with each channel, each retaining member being engageable with the tops of a neighbouring pair of partitions so as to close the open top of the channel formed therebetween, a resilient deformable region being formed on each retaining member which extends down into the channel upon engaging the member with the partitions so as to compress cables located in the channel between the resiliently deformable member and the bottom of the channel and thereby securely retain the cables in place.

A channelling assembly in accordance with the present disclosure has the advantage that the cables are securely retained in the channels whilst the resilient deformability of the lower portion of the retaining member helps ensure that the cables are not crushed.

In one form, the height of the resiliently deformable member is adjustable to enable different cable bundle heights/thicknesses to be accommodated by varying the distance the resiliently deformable material extends into the channel. In a particularly advantageous configuration, the resilient deformable member is formed by a number of planar panels which are stacked on top of each other and connected to each other along just a narrow connection line which forms a tear line that enables the bottom panel to be removed easily from the remainder of the stack to reduce the height of the retaining member and thereby allow more cables to be accommodated in the channel. In another form, each planar panel is joined to its neighbouring planar panels along on longitudinal edge, a panel easily being separable from the stack by tearing along said edge.

In still another form, each panel is releasably attachable to its neighbouring panels, for example by using of hook and loop fastening means, re-attachable adhesive or the like. In that way, the height of the stack forming the resilient deformable member may be increased as well as reduced.

As an alternative, each retaining member is positively latched into place across the top of a channel so as to be securely held in place. In particular, each retaining member may include protrusions which are a close tolerance fit in recesses formed in the tops of the partitions, although other retaining systems well known in the art may also be utilized.

Further areas of applicability will become apparent from the description provided herein. It should be understood that the description and specific examples are intended for purposes of illustration only and are not intended to limit the scope of the present disclosure.

DRAWINGS

In order that the present disclosure may be well understood, there will now be described various forms thereof, given by way of example, reference being made to the accompanying drawings, in which.

Figure 1:
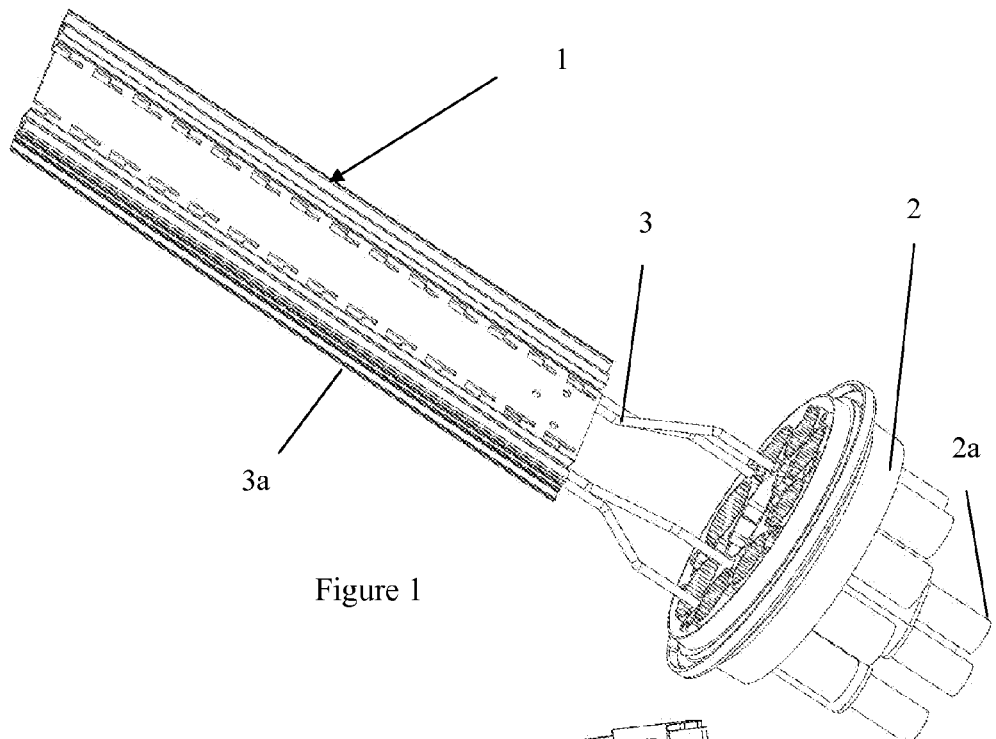
FIG. 1 is a perspective view of a support apparatus of a fibre optic cable storage and management assembly according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring first to FIG. 1, there is shown a support apparatus, generally indicated by reference numeral 1, which forms part of a fibre optic cable storage and management assembly according to the present disclosure. The support apparatus 1 comprises an entry manifold 2, which in use may be oriented pointing downwards or horizontally, with a mounting frame 3 extending from the back of the manifold 2 so as, in use, to extend upwards or horizontally. A cylindrical cover (not shown) engages over the mounting frame 3 and sealingly engages with the upper side of the manifold so as to enclose the frame 3 and the cable management back plates mounted thereon as discussed below in a weatherproof environment.

The entry manifold 2 has cable entry ports 2a extending from its lower end which is used for feeding cables into and out of the assembly. Heat shrinkable sleeves or rubber mechanical seals are applied between entry ports 2a and the cables entering the ports to prevent the ingress of water into the weatherproof environment.

Figure 2:
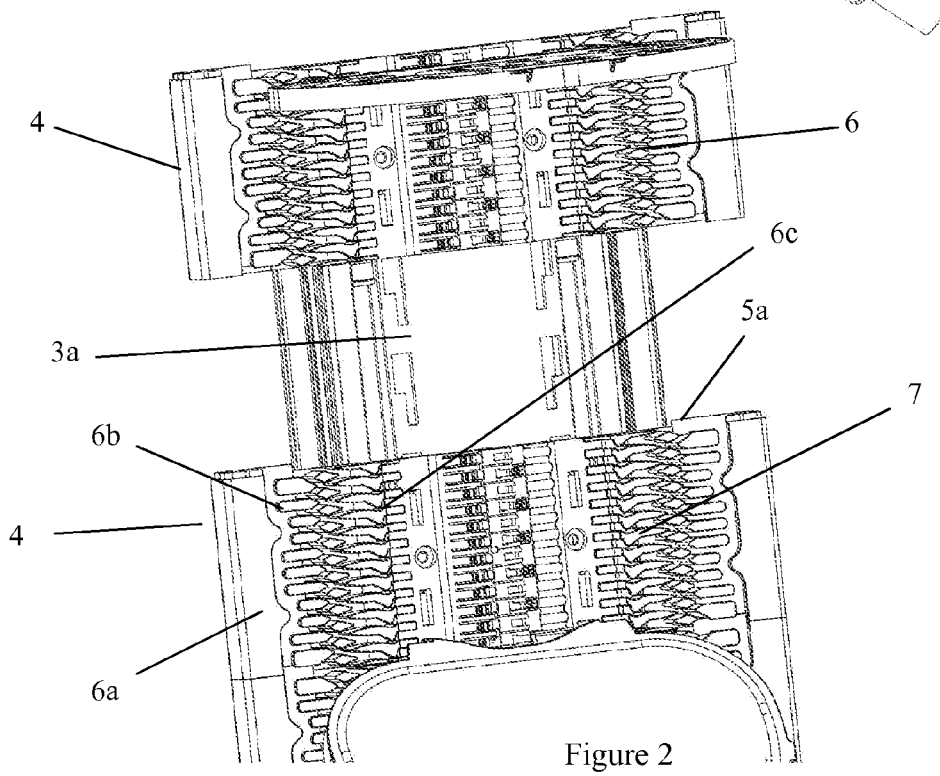
FIG. 2 is a perspective detail view of the support apparatus of FIG. 1 with management back plates mounted thereon.

The mounting frame 3 includes an elongated extrusion 3a which is shaped to slidably mount a plurality of management back plates 4 of the type shown in FIG. 2. Each back plate 4 includes a mounting profile on its underside which cooperates with a corresponding profile formed on the extrusion 3a to secure the back plate 4 to the extrusion. The exact form of inter-engaging profile is not important to the present disclosure.

Figure 3:
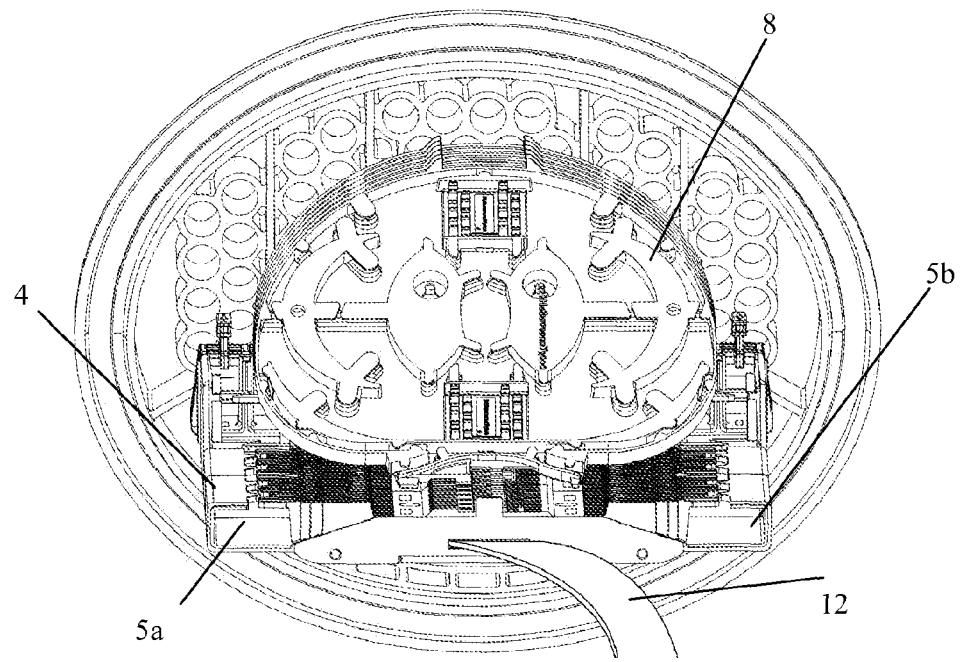
FIG. 3 is an end view of the support apparatus of FIG. 1 with management back plates and cassettes mounted thereon.

As can be seen most clearly in FIG. 3, each back plate 4 has a passageway 5a & 5b extending along each side thereof which forms a protective enclosure for housing exposed fibre optic cables as they are routed along the back plate. The back plates 4 will typically be mounted on the extrusion 3a in end to end configuration with the passageway sections 5a, 5b on each side aligned, thereby creating a cable run which extends along each side of the assembly substantially the entire length thereof.

Each tunnel section 5a, 5b is open towards the opposing side of the back plate 4 so as to enable fibre optic cables to be routed out of the passageway section and across the back plate to a management cassette 8 mounted thereon as described below. A fibre optic cable can similarly be routed from a management cassette and across the back plate 4 to the passageway on the opposing side. As best shown in FIG. 2, each back plate 4 has fibre guide features 6 formed on its upper surface which define between them tracks 7 into which fibres can be fed as they are routed out of one of the passageways 5a, 5b in order to protect them as they are tracked towards or away from the management cassette. The fibre guide features comprise a plurality of posts 6 which extend from the rear of the back plate 4, the spaces between adjacent posts 6 forming the tracks in which the fibres engage.

As shown in FIG. 2, three rows of posts 6 are provided on each side of the back plate 4 so as to be associated with each passageway 5a, 5b. Each post 6a of the first row 6a, which is closest to the passageway 5a, has a blunt end directed towards the passageway 5a and a pointed end directed towards the middle of the back plate 4 and towards the outer end of the adjacent post 6 of the second row 6b. Each post 6b of the second row 6b in turn has both its outer and inner ends formed into a point, the outer end pointing between two posts 6a of the first row and the inner end point between two posts 6c of the third row. Each post 6c of the third row 6c is then shaped at its outer end to guide a fibre exiting the channel between the adjacent posts 6b of the second row 6b into the adjacent channel of the third row, and at its inner end to guide a fibre onto a management cassette 8 mounted on the back plate as described below.

Figure 4:
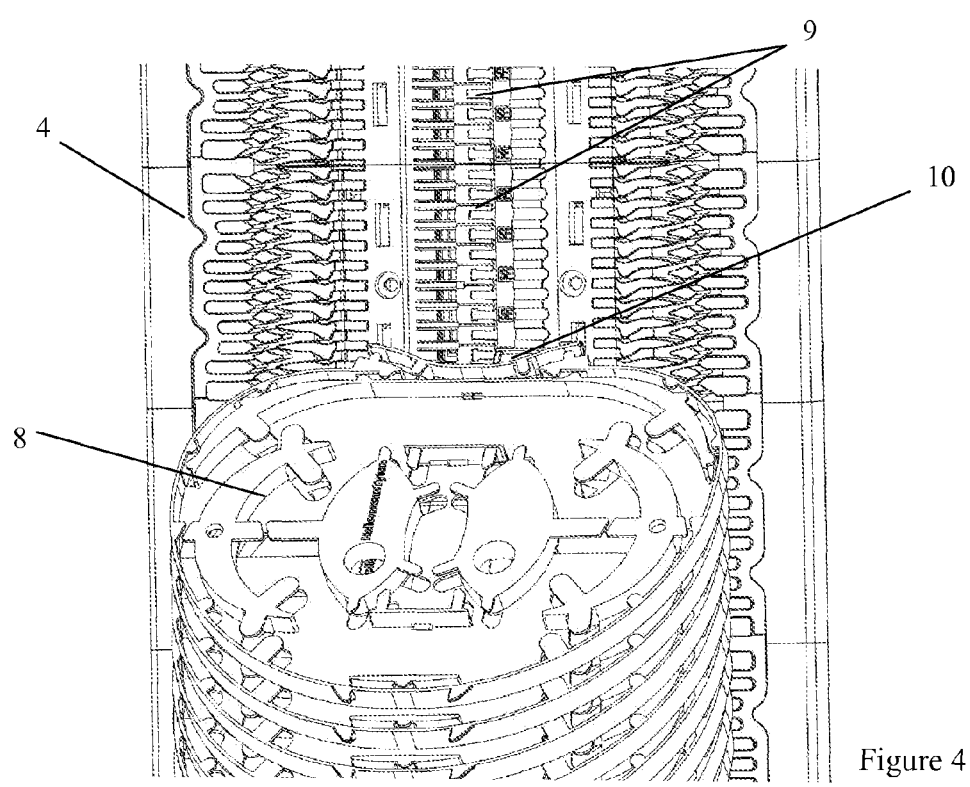
FIG. 4 is a close-up view of part of a management cassette mounted on a back plate.
Figure 5:
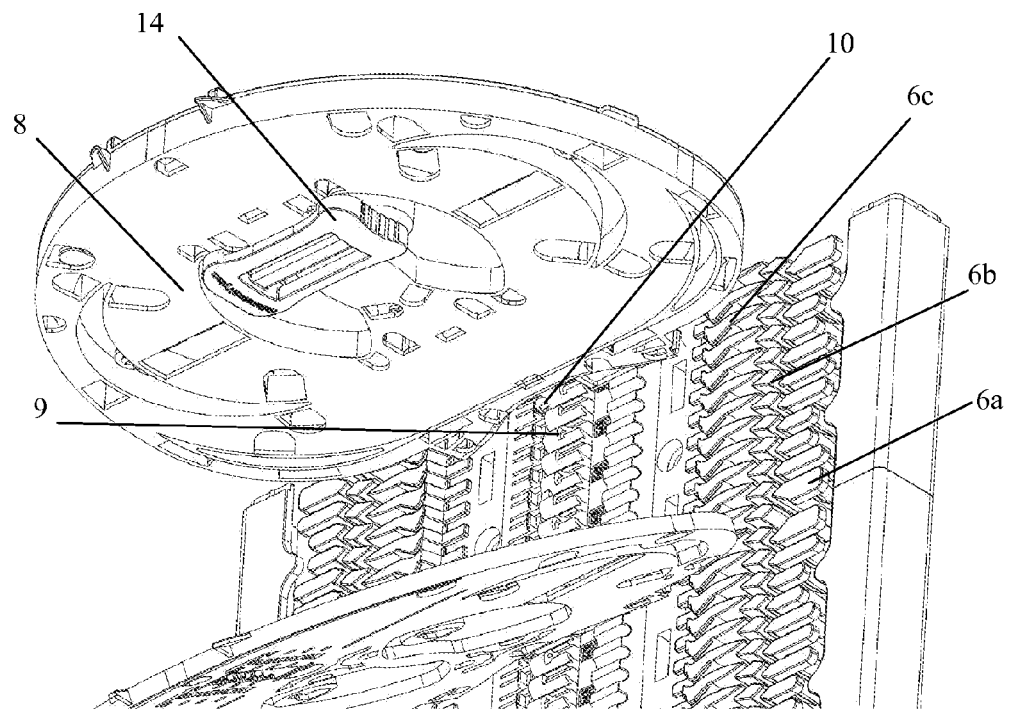
FIG. 5 is a rear view of a management cassette with a strap buckle provided thereon.

Formed along the centre of each back plate 4 is a plurality of mounting hoops 9 for pivotally mounting a plurality of management cassettes 8 onto the back plate 4. As best seen in FIG. 4, each mounting hoop 9 has its axis directed transversely to the back plate and they are arranged side by side across the length of the back plate. Each hoop 9 is sized to receive a mounting pin 10 formed on the bottom of a management cassette 8 so as to pivotally mount the cassette to the back plate. It will be appreciated that the exact form of pin and hoop may vary, and, for example, the pin may be provided on the back plate and the hoop on the cassette. Equally, other forms of pivotal mount may be used.

The hoops 9 are sized and shaped so that cassettes 8a of a first thickness can be engaged with every hoop 9, the spacing being sufficient to allow each cassette to be rotated through 90 degrees to enable access to each back plate 4 and each neighbouring cassette. Furthermore, cassettes 8b of a double thickness may be engaged only with every other hoop so as to allow the additional thickness of the cassette to be accommodated whilst still allowing a 90 degree pivotal movement of a stack of cassettes mounted on the back plate. Similarly, a triple thickness cassette may be mounted on a back plate extending across three mounting hoops 9 so that a number of such triple thickness cassettes can be mounted one on every third hoop 9. Combinations of cassettes of different thicknesses may also be used together, the mounting pins 10 being engaged with appropriately spaced hoops so as to enable pivotal movement of the cassettes for access purposes.

Each cassette 8 is pivotable on the back plate between an open position in which it is folded against the cassette below, as exemplified by cassette 8 (1) in FIG. 8, and an upright closed position in which it is folded back against the cassette 8 above it as exemplified by cassette 8 (2) in FIG. 8. In this way, the front or fibre management side 8c of any cassette 8 can be exposed for working access purposes by moving every cassette above the one to which access is required into its upright closed position.

Figure 6:
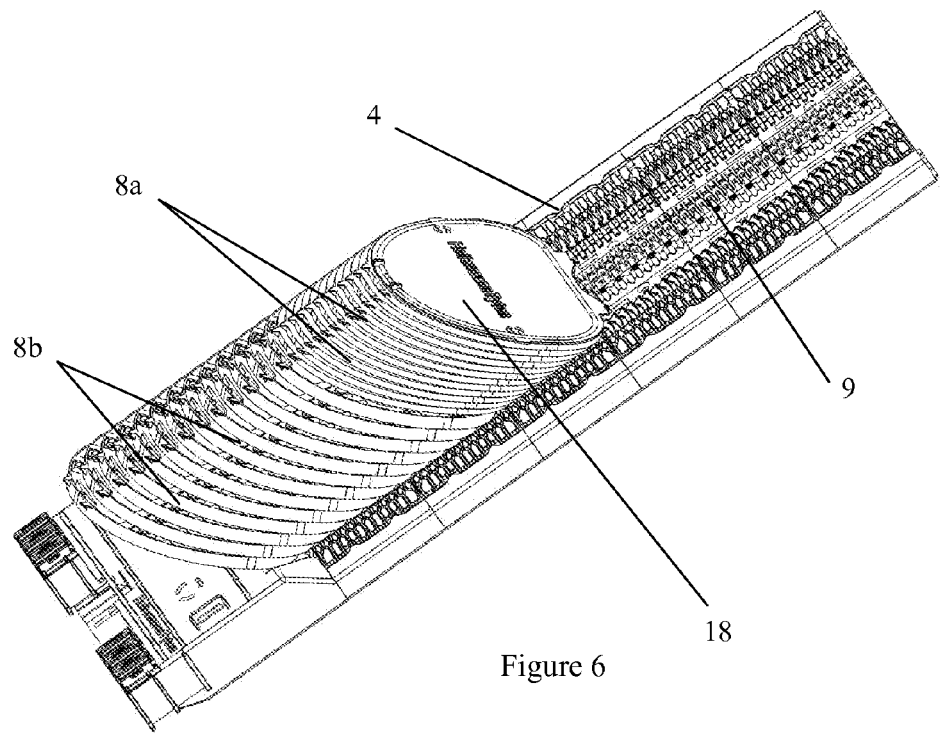
FIG. 6 is a perspective top view of a collection of management back plates with cassettes of different thicknesses mounted thereon.
Figure 7:
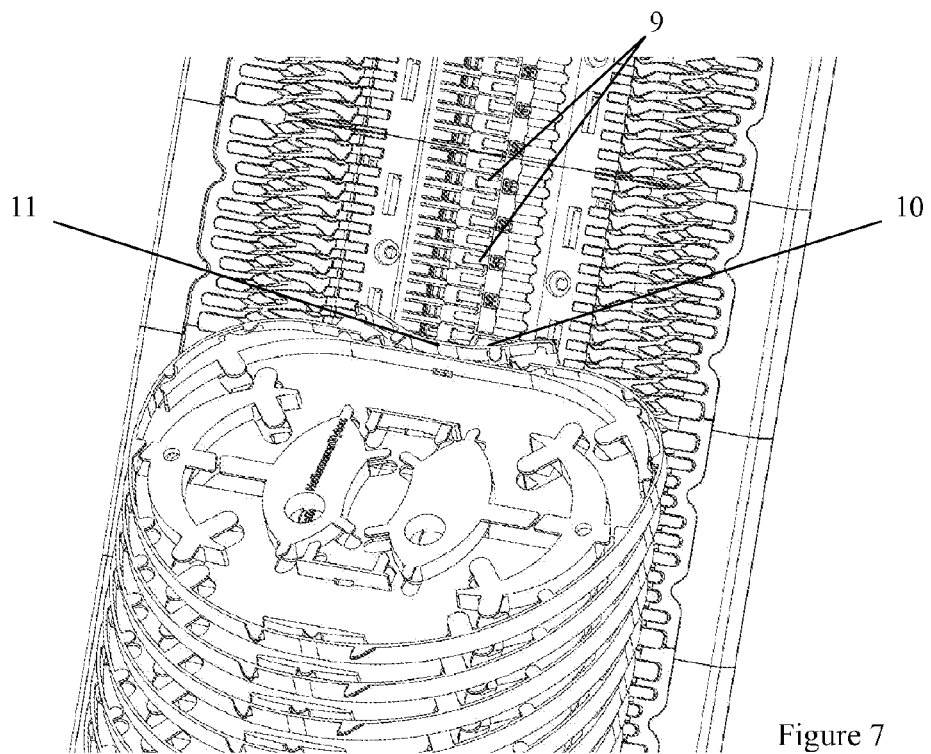
FIG. 7 is a close-up view of a management cassette showing the attachment to the back plate.

When the support apparatus 1 is installed with the entry manifold 2 lowermost, the cassettes will normally be pivoted downwards so that the front 8c of all but the top cassette is concealed and the fibres managed thereon protected. A cover panel 18 (see FIG. 6) is mounted to the top cassette 8, engaging and securing with features on the cassette. The purpose of the cover panel 18 is to overlie the front 8c of the top cassette so as to protect fibres which are being managed thereon.

In order to ensure that the cassettes 8 are properly secured when not being accessed by an engineer, a securing strap 12 is provided which is attached somewhere at the top end of the support apparatus 1, for example to the top of the support apparatus 1 or to the top of the uppermost back plate, extending around the top edge of that back plate. A releasable attachment, such as a buckle, is then provided proximate to the entry manifold 2, below the cassette stack. In order to secure the cassettes in their downward positions for storage, the strap 12 is pulled across the top of the cassettes and the end secured to the buckle. The tension in the strap then prevents upward movement of the tops of the cassettes necessary for them to pivot towards their upward positions.

Figure 8:
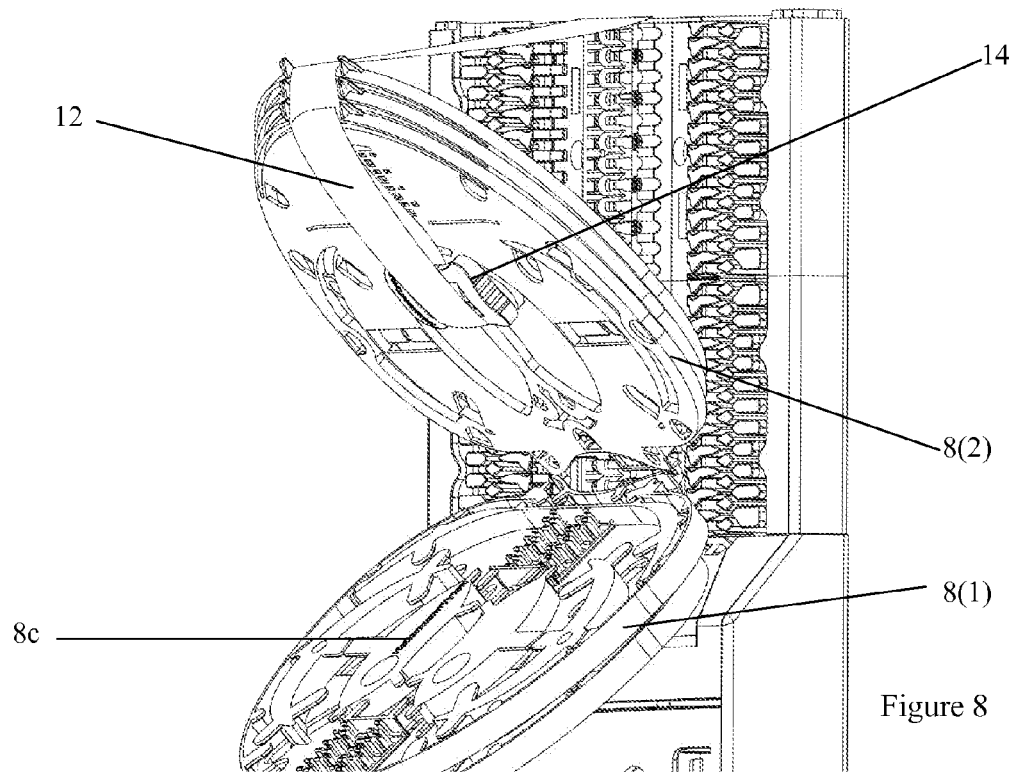
FIG. 8 is a perspective view of a set of management cassettes strapped in an open position.
Figure 9:
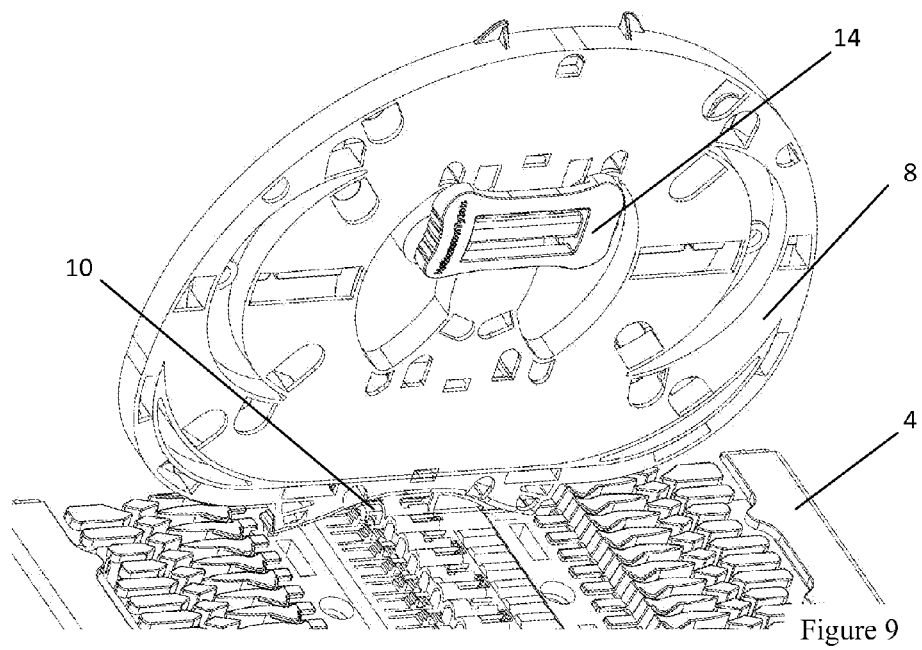
FIG. 9 is an enlarged rear view of the back of a management cassette showing the strap buckle formed thereon.

Furthermore, each cassette has features on its back surface 8(2) to accept a releasable attachment 14 as shown in FIGS. 8 and 9. The strap 12 may therefore be pre-assembled to the releasable attachment 14. The releasable attachment 14 may then be secured across only some of the cassettes so as to retain them in an upward position against the gravity force which will naturally cause them to pivot to their downward position if the assembly is installed in an upright position with the entry manifold lowermost. This enables an engineer to expose the front face 8c of a selected cassette 8 so as to enable work to be carried out on that cassette in a convenient manner, in particular without having to hold the other cassettes out of the way.

In one form, the strap 12 is formed with a hoop and loop material enabling it to be looped through the releasable attachment 14 and back onto itself. In an alternative configuration not shown, the releasable attachment comprises a loop through bar provided on the front edge or underside of each cassette, the strap looping through the bar of the cassette in above the one which is to be worked on and then secured back on itself. This configuration is advantageous as it avoids the thickness of each cassette being increased by the presence of a buckle or the like on the back thereof.

Figure 10:
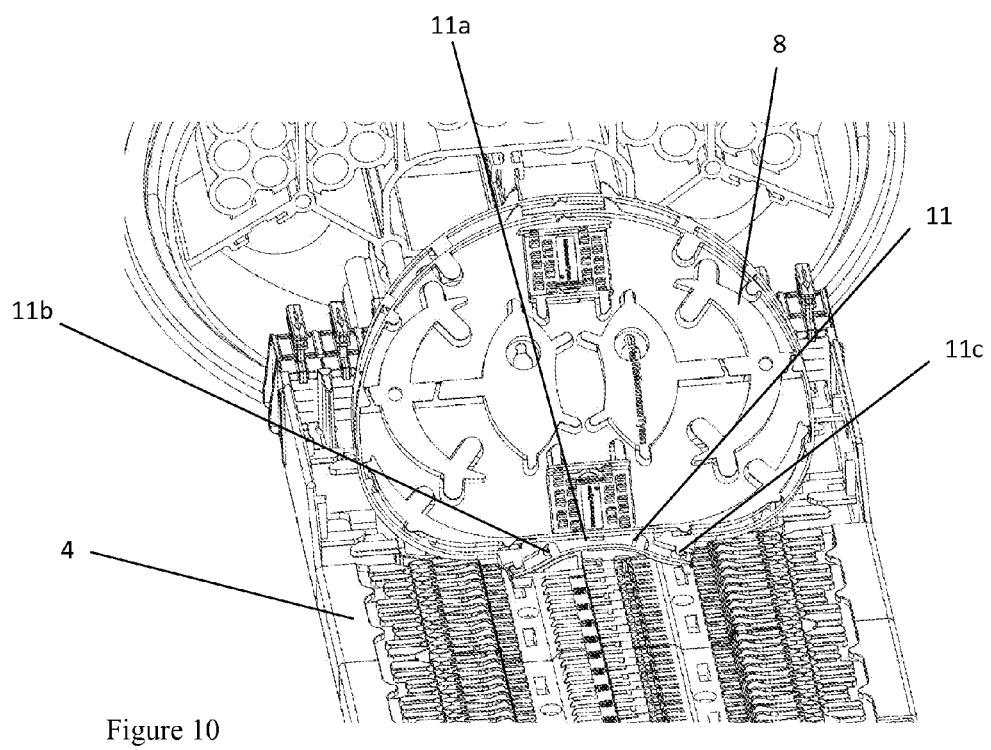
FIG. 10 is a front view of a management cassette showing the fibre entry points and guide ramps.
Figure 11:
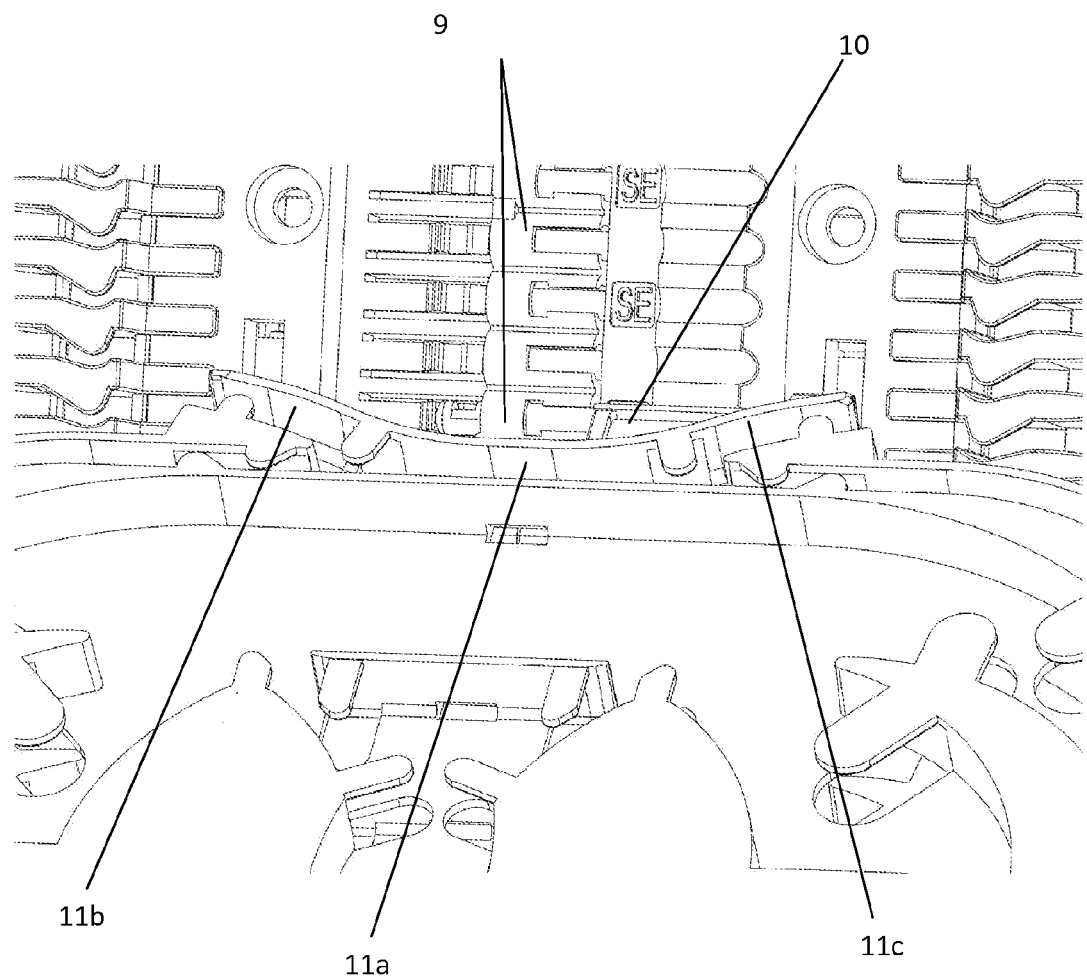
FIG. 11 is an enlarged view showing the fibre guide ramp and attachment means for the management cassette.

Each cassette 8 furthermore has a ramped entry guide 11 formed at the fibre entry/exit ports extending on either side of the mounting pin 10 (see FIGS. 10 and 11). The ramp guide 11 is located centrally and has a humped shape as can clearly be seen in FIG. 11. From the peak 11a of the hump, a ramp surface 11b, 11c extends downwards and sideways, within the plane of the cassette 8, towards opposing sides of the back plate 4 to which the cassette is mounted, the end of each ramp terminating at a height slightly higher than the top of the inner row of posts 6c. Fibres routed from the tunnel 5a across the back plate between the rows of posts 6a, 6b, 6c are then guided onto the facing end 11b of the ramp guide 11 and up onto the cassette as shown in FIG. 10. The guiding of the fibres onto the cassette 8 by the ramp guide 11 ensuring that the transition of fibres onto and off of the cassette 8 occurs in a shielded manner, reducing the possibility of the fibres being damaged. Furthermore, as shown in FIG. 10, the spaced apart ends 11b, 11c of the ramp guide 11 co-operating with opposing sides of the back plate means that cross over of the fibres takes place on the cassette rather than on the back plate as in prior art systems. As a result, the fibres are better supported and the risk of damage to the fibres reduced.

Figure 12:
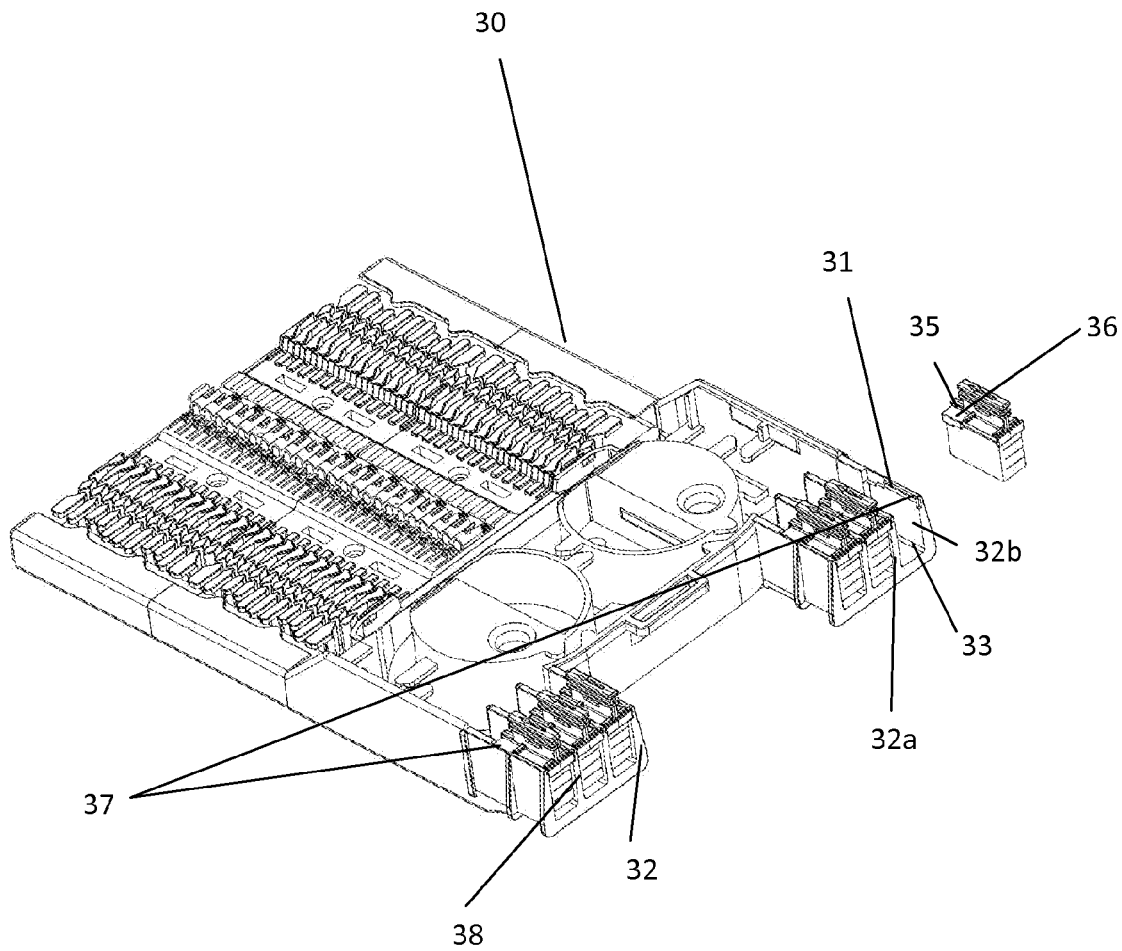
FIG. 12 is a perspective view of a cable storage tray including a channeling assembly according to the present disclosure.

Referring now to FIG. 12, there is a cable storage tray 30 incorporating an innovative cable channelling assembly indicated by reference number 31. The assembly is formed by spaced apart upwardly standing partitions 32 which are arranged in parallel space apart configuration so as to define a channel 33 between each neighbouring pair of partitions 32a, 32b. Cable 34 may be laid in each channel 33 through the open top thereof so as to be routed onto the tray 30 for storing thereon A clamp member 35 is fixable to the top of each channel 33 in order to retain the cables within the channel 33. The clamp member 35 has a pair of lateral ribs 36 formed one on either side which are engageable in complementary shaped slots 37 formed close to the top of each of the partitions. The width of the clamp member 35 including the ribs 36 is wider than the opening defined between the tops of neighbouring partitions members, the partitions being flexible to enable the ribs to be engaged in the slots 37, the resilience of the partitions then clamping the member 35 in place.

Each clamp member 35 has a stack of planar sponge panels 38 attached to its lower surface which, upon engagement with one of the channels 33, extends down towards the bottom of the channel so as to compress fibres engaged in the channel. The compliance of the sponge material ensures that the fibres are held in their set orientation whilst at the same time they are not excessively compressed.

In order to accommodate different cable and cable bundle sizes laid in the channel, the sponge panels 38 may be separated from each other in order to reduce the height of the stack and thereby enable more cables to be housed within the channel 33 without over compressing them. This is achieved in the illustrated form by each panel 38 being connected to each of its nearest neighbours along just one edge. The bottom panel or a group of panels 38 may then be separated from the remainder of the clamping member 37 by simply folding along the appropriate line and then tearing to release all panel 38 below the elected fold line from the remainder of the stack.

The actual management of the fibres which takes place on the cassettes includes but is not limited to splicing, splitting, terminating, storage, as well as other management actions which are well known to the skilled person in the art. All these actions are carried out in entirely conventional ways and hence will not be described any further.

Evidently the present disclosure is not limited to the forms of the method described above as examples, but on the contrary encompasses all possible variants.

What is claimed is:

1. A channelling assembly for guiding cable on a cable management tray, the assembly comprising:
   a ducting member having an inlet end, an outlet end and partitions extending between the inlet end and the outlet end so as to form open top channels therebetween into which cable can be laid through the open top of each channel;
   a retaining member associated with each channel, each retaining member being engaged with tops of a neighbouring pair of partitions so as to close the open top of the channel formed therebetween; and
   a resiliently deformable region being formed on each retaining member which extends down into the channel upon engaging the retaining member with the partitions so as to compress cables located in the channel between the resiliently deformable member and the bottom of the channel and thereby securely retain the cables in place; wherein the resiliently deformable member is formed by a plurality of planar panels which are stacked on top of each other and connected to each other along a narrow connection line which forms a tear line that enables a bottom panel to be removed easily from the remainder of the stack to reduce the height of the retaining member and thereby allow more cables to be accommodated in the channel.

2. A channelling assembly according to claim 1, wherein each planar panel is joined to its neighbouring planar panels along on longitudinal edge, a panel easily being separable from the stack by tearing along said edge.

3. A channelling assembly according to claim 1, wherein each panel is releasably re-attachable to its neighbouring panels.

4. A channelling assembly according to claim 1, wherein each retaining member positively is latched into place across the top of a channel so as to be securely held in place.

5. A channelling assembly according to claim 4, wherein each retaining member includes protrusions which are a close tolerance fit in recesses formed proximate the tops of the partitions.

* * * * *